Jan. 30, 1923.
W. R. DOXEY.
OPTICAL INSTRUMENT.
FILED AUG. 26, 1921.
1,443,704.
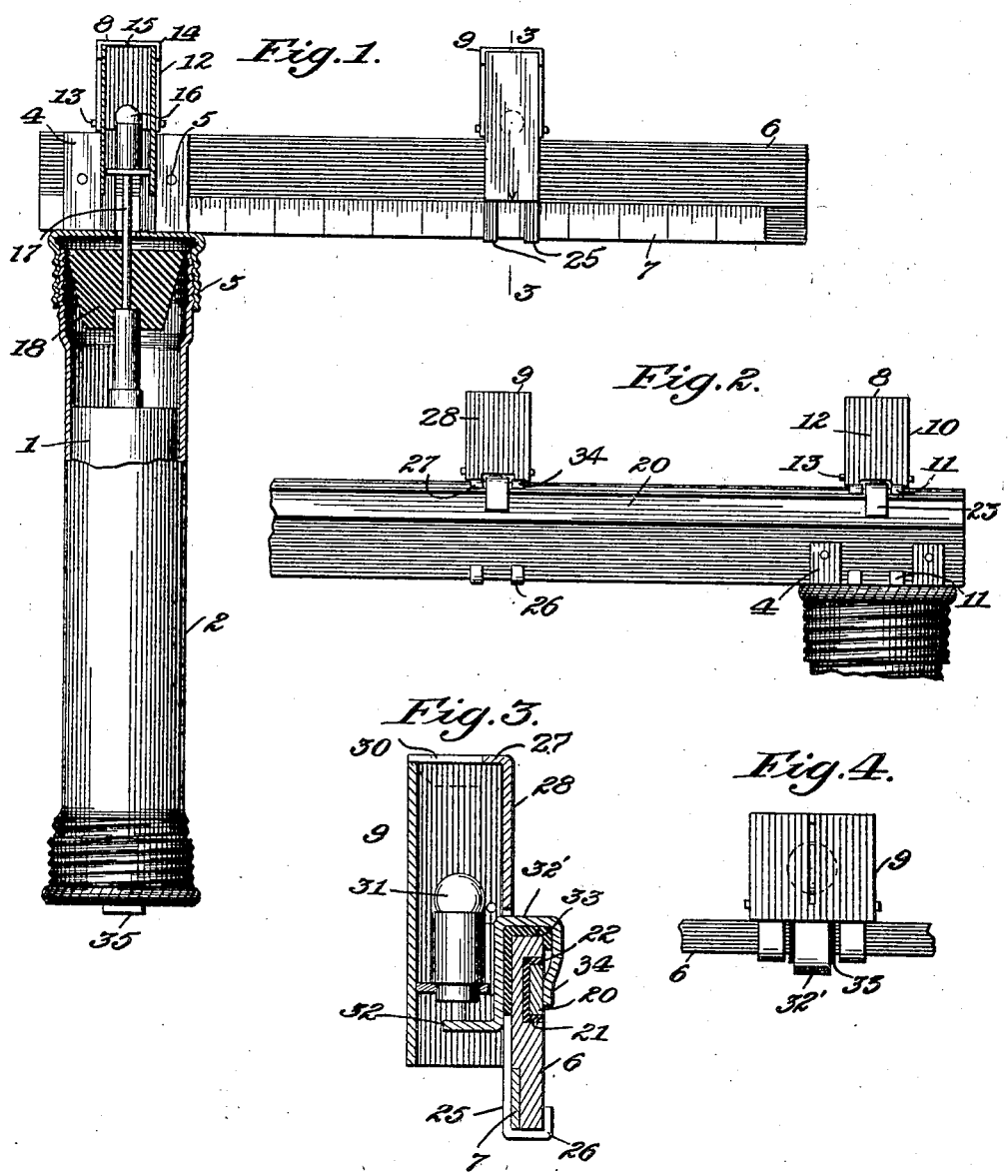
Inventor:
Willard R. Doxey,
Fenelon B. Brock
Atty.

Patented Jan. 30, 1923.

1,443,704

UNITED STATES PATENT OFFICE.

WILLARD R. DOXEY, OF OGDEN, UTAH.

OPTICAL INSTRUMENT.

Application filed August 26, 1921. Serial No. 495,627.

*To all whom it may concern:*

Be it known that I, WILLARD R. DOXEY, a citizen of the United States, residing at Ogden, in the county of Weber and State of Utah, have invented a new and useful Optical Instrument, of which the following is a full, clear, and exact specification.

The invention relates to improvements in optical instruments designed especially for use by optometrists and oculists in measuring the distance between the pupils of the eyes for determining the size of the lenses and adapting them to the eyes, for use in eyeglasses and spectacles.

The primary object of the invention is the provision of an instrument of this type that is comparatively inexpensive in construction, which may be manipulated with facility, and by means of which the required measurements may be made with convenience and accuracy.

To this end the invention consists in certain novel combinations and arrangements of parts involving the use of electric lights or lamps, in combination with a pair of measuring devices, that are adapted to be focused on the pupils of the eye for ascertaining the distance between the pupils, as will be hereinafter more fully set forth and claimed.

In the accompanying drawings I have illustrated one complete example of the physical embodiment of my invention wherein the parts are combined and arranged according to the best mode I have thus far devised for the practical application of the principles of my invention, which has proven highly satisfactory in actual use.

Figure 1 is a top plan view of an instrument embodying the subject matter of my invention, some parts being shown in section for convenience of illustration.

Figure 2 is a rear or underside view of a part of the device.

Figure 3 is an enlarged, transverse sectional view, on line 3—3 of Figure 1, of the movable measuring device showing its relation to the supporting beam or arm therefor.

Figure 4 is an end view of one of the measuring devices showing particularly the slot for transit of a light ray therethrough, from an enclosed lamp.

In the preferred form of the invention as illustrated in the drawings, I utilize an electric battery of the dry type as 1 inclosed within the casing 2, and to the cap 3 of the casing or cylinder 2 I attach, by means of the fixed lugs 4 and rivets 5, the supporting arm or scale beam 6. The scale beam is preferably of steel, and equipped with a scale 7 having markings thereon according to the metric system, and the beam is rigidly attached to the cap, whereby the casing may readily be disengaged from the cap and beam when desired or required.

There are two measuring devices supported on the beam, an immovable one designated as a whole by the numeral 8 and fixed to the beam at the casing end thereof, and a slidable or movable device 9, which may be adjusted on the beam relatively to the fixed device. These two devices are designed to be used in co-operation, for instance the device 8 to be registered with the right eye and the device 9 to be registered, by adjustment on the beam toward or away from the device 8, for engaging the distance on the scale 7 between the eyes.

The fixed device comprises a housing 10, open at bottom and top and provided with flanged lugs 11 (Figure 2) fixed over the edges of the beam 6, and alined in position substantially in the longitudinal axis of the battery casing 2. A door 12 is hinged at 13 to the housing and is provided with a flanged end or plate 14 covering the open end of the housing and fashioned with a narrow slot or slit 15 therein. Within the housing is enclosed an electric lamp or bulb 16 from which extends the conductor or wire 17 through the insulated plug 18 to the cell or battery 1, and the lamp is adapted to shed its rays through the slot or slit 15 in the end of the housing and be focused on the right eye of the person examined for measurements.

The lower or underside of the scale beam 6 is grooved as at 20, the groove extending longitudinally of the beam, and in this groove is fixed a copper conductor plate 21, which is insulated, as at 22 from the beam. The lamp 16 is electrically connected with the conductor plate through the bent conductor plate or strip 23 (see Figure 2) and the current thus passes from the cell 1, through conductor 17, the lamp 16, strip 23 to the conductor plate 20, thence out through said conductor plate to the movable measuring device 9, regardless of the position of this latter device on the scale beam.

As best seen in Figure 3, the device 9 also includes a housing as 24, quite similar to the housing of device 8, and this housing 24 is provided with arms 25 and opposed fingers 26 and 27 that are bent around the opposite edges of the beam to act as guides and permit the measuring device 9 to be slid along on the beam toward or away from the fixed device 8. The housing 24 also has a hinged door 28 provided with an end plate 29 to close its open end, and the plate 29 is fashioned with a slit or slot 30 similar to the slot 15 of the door 12 of the housing 10. Within the housing 9 a second lamp or electric bulb 31 is enclosed, with its stem 32 in contact with a bent conductor plate 32'. In Figure 3 it will be seen that this conductor plate 32' is somewhat of U shape and bends over one edge of the scale beam, from which it is insulated at 33, with its extremity 34 in contact with the long conductor plate 20.

Thus the conductor 32' which is carried and movable with the measuring device 9 receives current from the conductor plate 20 for the lamp 31, and from the lamp and housing the current passes back to the battery through the scale beam 6, cap 7 and casing 2, by way of a switch or other suitable connection indicated at 35 in Figure 1.

In using the device, the instrument is held in the hand by grasping the casing 2 as a handle, and holding the instrument as in Figure 1. With the battery circuit closed, the device 8 is held in position so that the light ray passing through the slot 15 is focused on the inner edge of the pupil of the right eye, and then the device 9 is slid along, either to right or left in Figure 1, until the beam from the lamp 31 passing through slot 30 is focused on the outer edge of the pupil of the right eye. After the device 9 has been properly adjusted and located the mark on the housing of device 9 will indicate the distance between the two devices 8 and 9, thus indicating the distance between the pupils of the two eyes, and the lenses of the eye glasses may then be quickly and conveniently adjusted with accuracy and reliability, in accordance with the indicated scale.

From the above description taken in connection with my drawings it will be apparent that I have provided an instrument of this character which may be manipulated with facility and convenience, and while the structure as exemplified in the drawings is capable of performing its functions in a comparatively perfect manner, it will be understood that changes and alterations may be made therein within the scope of my claims, without departing from the spirit of my invention.

Having thus fully described my invention, what I claim as new and desire to secure by Letters Patent is—

1. The combination in an instrument as described, including an electric circuit and a battery forming a handle, of a scale beam and scale thereon supported from said battery, a fixed device on said beam including a housing and a lamp therein, a slidable device on said beam including a housing and a lamp therein, and said slidable device being movable relative to the fixed device for focusing light beams from said lamps on spaced objects.

2. The combination in an optical instrument including a battery and electric lighting circuit, of a scale beam and a fixed device having a lamp therein, a conductor plate in said circuit and carried by said beam, a slidable device on said beam having a contact plate connected with said conductor plate, and lamps within said fixed and slidable devices adapted to be focused on two spaced objects for measuring the distance therebetween.

3. The combination in an optical instrument with a scale beam and scale thereon, of a fixed housing and an electric lamp therein adapted to shed a light beam, an electric lighting circuit including said lamp, a relatively movable housing and a lamp therein adapted to shed a light beam, means for guiding said movable housing, a conductor plate carried by said beam, and a contact plate carried by said movable housing forming an electrical connection between the lamp in said housing and the conductor plate.

4. The combination in a measuring instrument as described with a scale beam and scale and including an electric lighting circuit, of a fixed housing on said beam and a lamp in said housing adapted to shed a light ray, a relatively movable housing having guide lugs engaging said beam, a longitudinally extending conductor plate on said beam, and a contact plate connecting the lamp in the movable housing with said conductor plate.

5. The combination in a measuring instrument as described with a scale beam and scale including an electric lighting circuit, of a housing fixed on said beam and provided with a slot, an electric lamp within said housing adapted to shed its rays through said slot, a relatively movable housing provided with a slot, and an electric lamp in said movable housing adapted to shed its rays through said slot.

WILLARD R. DOXEY.